United States Patent
Takagawa et al.

(10) Patent No.: US 11,376,453 B2
(45) Date of Patent: Jul. 5, 2022

(54) ARTICLE TRANSPORT FACILITY

(71) Applicant: Daifuku Co., Ltd., Osaka (JP)

(72) Inventors: Natsuo Takagawa, Hinocho (JP); Toshikazu Kato, Hinocho (JP)

(73) Assignee: Daifuku Co., Ltd., Osaka (JP)

( * ) Notice: Subject to any disclaimer, the term of this patent is extended or adjusted under 35 U.S.C. 154(b) by 433 days.

(21) Appl. No.: 16/427,487

(22) Filed: May 31, 2019

(65) Prior Publication Data
US 2019/0381342 A1 Dec. 19, 2019

(30) Foreign Application Priority Data

Jun. 13, 2018 (JP) .............................. JP2018-112900

(51) Int. Cl.
| | |
|---|---|
| *B65G 35/00* | (2006.01) |
| *B65G 43/00* | (2006.01) |
| *B65G 47/00* | (2006.01) |
| *A62C 2/24* | (2006.01) |
| *A62C 2/22* | (2006.01) |
| *A62C 3/00* | (2006.01) |

(52) U.S. Cl.
CPC ............... *A62C 3/002* (2013.01); *A62C 2/24* (2013.01); *B65G 35/00* (2013.01); *B65G 43/00* (2013.01); *B65G 47/00* (2013.01); *A62C 2/22* (2013.01)

(58) Field of Classification Search
None
See application file for complete search history.

(56) References Cited

U.S. PATENT DOCUMENTS

| | | | |
|---|---|---|---|
| 11,009,877 B2* | 5/2021 | Hofmann | G05D 1/0088 |
| 11,059,672 B2* | 7/2021 | Ogawa | B65H 7/06 |
| 2006/0289175 A1* | 12/2006 | Gutowski | A62C 37/10 169/46 |

FOREIGN PATENT DOCUMENTS

| | | | |
|---|---|---|---|
| CN | 1590247 A | | 3/2005 |
| CN | 100353270 C | * | 12/2007 |
| JP | 6254307 A | | 3/1987 |
| JP | 11305838 A | | 11/1999 |

* cited by examiner

*Primary Examiner* — Kavel Singh
(74) *Attorney, Agent, or Firm* — The Webb Law Firm (57) ABSTRACT

An area is set as an interference area, in which a transport vehicle is located in a state in which a portion of the transport vehicle overlaps a door trajectory which is a movement trajectory of a fire protection door. A control portion that controls a subject vehicle, which is a transport vehicle to be controlled, prohibits the whole subject vehicle from entering the interference area if it is determined, based on another-vehicle information, which is information of a traveling state of another vehicle that is different from the subject vehicle, and information regarding the interference area, that the interference area is present between the another vehicle located forward of the subject vehicle and the subject vehicle, and that a stoppable area is not secured between a rear end position of the another vehicle and the fire protection door.

4 Claims, 9 Drawing Sheets

ARTICLE TRANSPORT FACILITY

CROSS-REFERENCE TO RELATED APPLICATION

This application claims priority to Japanese Patent Application No. 2018-112900 filed Jun. 13, 2018, the disclosure of which is hereby incorporated by reference in its entirety.

FIELD OF THE INVENTION

The present invention relates to an article transport facility that transports articles using a transport vehicle that travels along a travel path.

BACKGROUND

JP H11-305838A discloses an article transport facility that transports articles using a transport vehicle (8) that travels along a travel path (2) including a fire protection door (10) (the reference numerals in the parentheses in the BACKGROUND are those used in the referred reference). This article transport facility includes an interlock mechanism in which, for example, when a leading vehicle that has moved past the fire protection door (10) is located in a predetermined area that is set on the downstream side of the fire protection door, an interlock signal is transmitted based on a result of detection by a proximity sensor provided along the travel path (2). A trailing vehicle receives the interlock signal, and stops on the upstream side of the fire protection door (10). When the leading vehicle advances to move out from the area, the interlock signal is cancelled, provided that the proximity sensor does not detect the leading vehicle, and that a collision prevention sensor (28) provided at the head of the trailing vehicle does not output a stop signal based on an inter-vehicle distance with the leading vehicle. Accordingly, the trailing vehicle can move past the fire protection door (10).

When a fire has occurred, such an interlock mechanism prohibits the trailing vehicle from moving past the fire protection door, and it is therefore possible to quickly close the fire protection door, without the transport vehicle (8) and the fire protection door (10) coming into contact with each other. However, even if a fire has not occurred, control is performed such that only one transport vehicle (8) can enter the above-described predetermined section, and thus the transport vehicle (8) often performs operations such as stopping or slowing down, and thus there is a possibility that the transport efficiency in a normal state will be reduced.

SUMMARY OF THE INVENTION

In view of the foregoing circumstances, there is a need for an article transport facility that can transport articles with high transport efficiency in a normal state in which no fire has occurred, and can promptly stop a transport vehicle and close a fire protection door when a fire has occurred, without the transport vehicle and the fire protection door coming into contact with each other.

In view of the foregoing, an article transport facility according to an aspect is an article transport facility that transports an article using a transport vehicle that travels along a travel path, including: a fire detection device that detects occurrence of a fire; a fire protection door that can move from an open position at which the transport vehicle can travel along the travel path to a closed position at which the travel path is blocked, when occurrence of a fire has been detected; and a control portion that controls the transport vehicle, wherein the control portion includes: a subject-vehicle position information acquisition portion that acquires subject-vehicle position information which is information regarding a position of a subject vehicle on the travel path, the subject vehicle being a transport vehicle to be controlled; an interference area storage portion that stores, as an interference area, an area in which the transport vehicle is located in a state in which a portion of the transport vehicle overlaps a door trajectory which is a movement trajectory of the fire protection door, on the travel path; and an another-vehicle information acquisition portion that acquires another-vehicle information which is a traveling state of another vehicle, the another vehicle being a transport vehicle that is different from the subject vehicle and that travels along the travel path, and the control portion prohibits the whole subject vehicle from entering the interference area if it is determined, based on the another-vehicle information and information regarding the interference area, that the interference area is present between the another vehicle located forward of the subject vehicle and the subject vehicle, and that a stoppable area corresponding to a length of the transport vehicle along the travel path is not secured between a rear end position of the another vehicle and the fire protection door.

With this configuration, the whole subject vehicle is prohibited from entering the interference area when the stoppable area is not secured between the rear end position of the another vehicle located forward of the subject vehicle and the fire protection door. The interference area is an area in which the transport vehicle is located in a state in which a portion of the transport vehicle overlaps a door trajectory which is a movement trajectory of the fire protection door, on the travel path, and the transport vehicle and the door trajectory overlap each other when the interference area and the whole transport vehicle overlap each other. When the interference area and the whole transport vehicle do not overlap each other, the transport vehicle and the door trajectory do not overlap each other, and the transport vehicle and the fire protection door at the closed position do not come into contact with each other. With the present configuration, when the stoppable area is not secured between the rear end position of the another vehicle and the fire protection door, control is performed such that the whole transport vehicle does not enter the interference area. Whether or not the stoppable area is secured is determined based on the another-vehicle information which is a traveling state of the another vehicle that travels along the travel path. That is, the likelihood of the transport vehicle coming into contact with the fire protection door can be reduced during normal traveling control, based on the positional relationship between the leading another vehicle and the subject vehicle, rather than by controlling the advancement of the subject vehicle using interlock or the like. Thus, with the present configuration, it is possible to transport articles with high transport efficiency in a normal state in which a fire has not occurred. When a fire has occurred, it is possible to prevent the transport vehicle and the fire protection door from coming into contact with each other, and to promptly stop the transport vehicle and close the fire protection door.

Further features and advantages will become apparent from the following description of embodiments with reference to the drawings.

DETAILED DESCRIPTION

Figure 1:
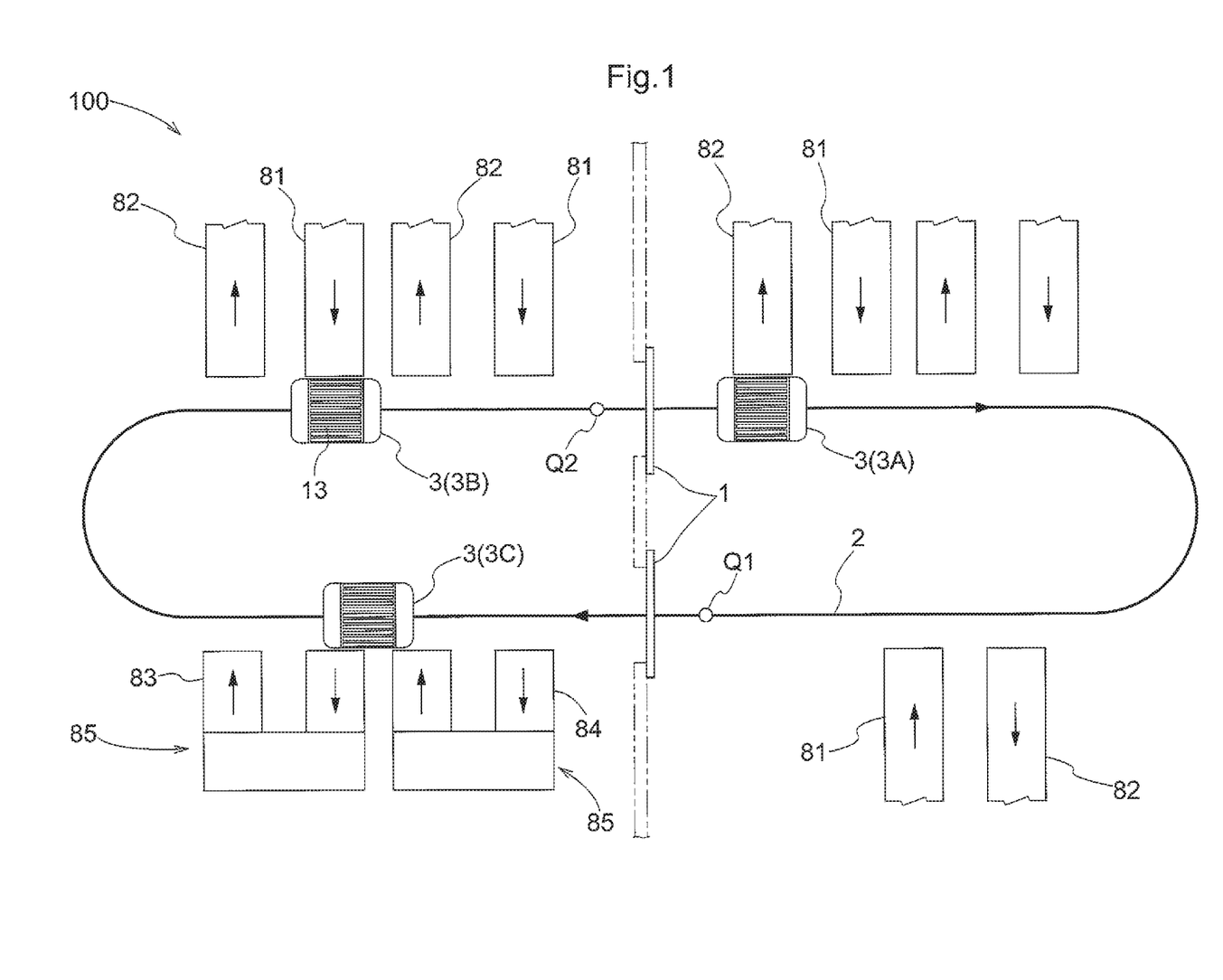
FIG. 1 is a diagram showing an overall configuration of an article transport facility.

The following is a description of an embodiment of an article transport facility with reference to the drawings. As shown in FIG. 1, an article transport facility 100 includes, as a travel path 2, a circulation track along which a transport vehicle 3 moves in one direction (the traveling directions indicated by the arrows in FIG. 1). A plurality of retrieval conveyors 81 and storage conveyors 82 that pass articles W (see FIG. 2, etc.) between the transport vehicle 3 and a storehouse (not shown) are provided along the travel path 2. In addition, a receiving conveyor 83 and a shipping conveyor 84 for passing the articles W between a picking station 85 and the transport vehicle 3 are also provided. Note that, at each picking station 85, an article W is received or shipped between the picking station 85 and the outside of the article transport facility 100. Each of the retrieval conveyors 81 and the storage conveyors 82, the receiving conveyor 83, and the shipping conveyor 84 is a transfer target location. The facility article transport facility 100 is provided with a fire protection door 1 that opens and closes by moving in a vertical direction Z (see FIGS. 2, 4) in order to inhibit the propagation of a gas such as smoke or the spreading of a fire by partitioning the interior of the facility when a fire occurs. A plurality of transport vehicles 3 travel along the travel path 2, and when a fire has occurred, each transport vehicle 3 stops at a stop position (Q1, Q2) that is set in front of the fire protection door 1, for example For the configuration shown in FIG. 1, a first transport vehicle 3A travels to and stops at a first stop position Q1, and a second transport vehicle 3B travels to and stops at a second stop position Q2. As will be described below, each of the transport vehicles 3 travel while referencing the traveling positions of other transport vehicles 3. In addition, a range sensor (not shown) that detects the inter-vehicle distance with the transport vehicle 3 traveling ahead thereof is also installed in each of the transport vehicles 3, and the transport vehicle 3 is controlled so as not to collide with the transport vehicle 3 traveling ahead thereof, based on a result of detection by the range sensor. Through these controls, a third transport vehicle 3C stops at a location rearward of the second transport vehicle 3B. Although a configuration in which the transport vehicles 3 stop at a preset stop position (Q1, Q2) is shown here, the transport vehicles 3 may stop immediately upon occurrence of a fire.

Figure 2:
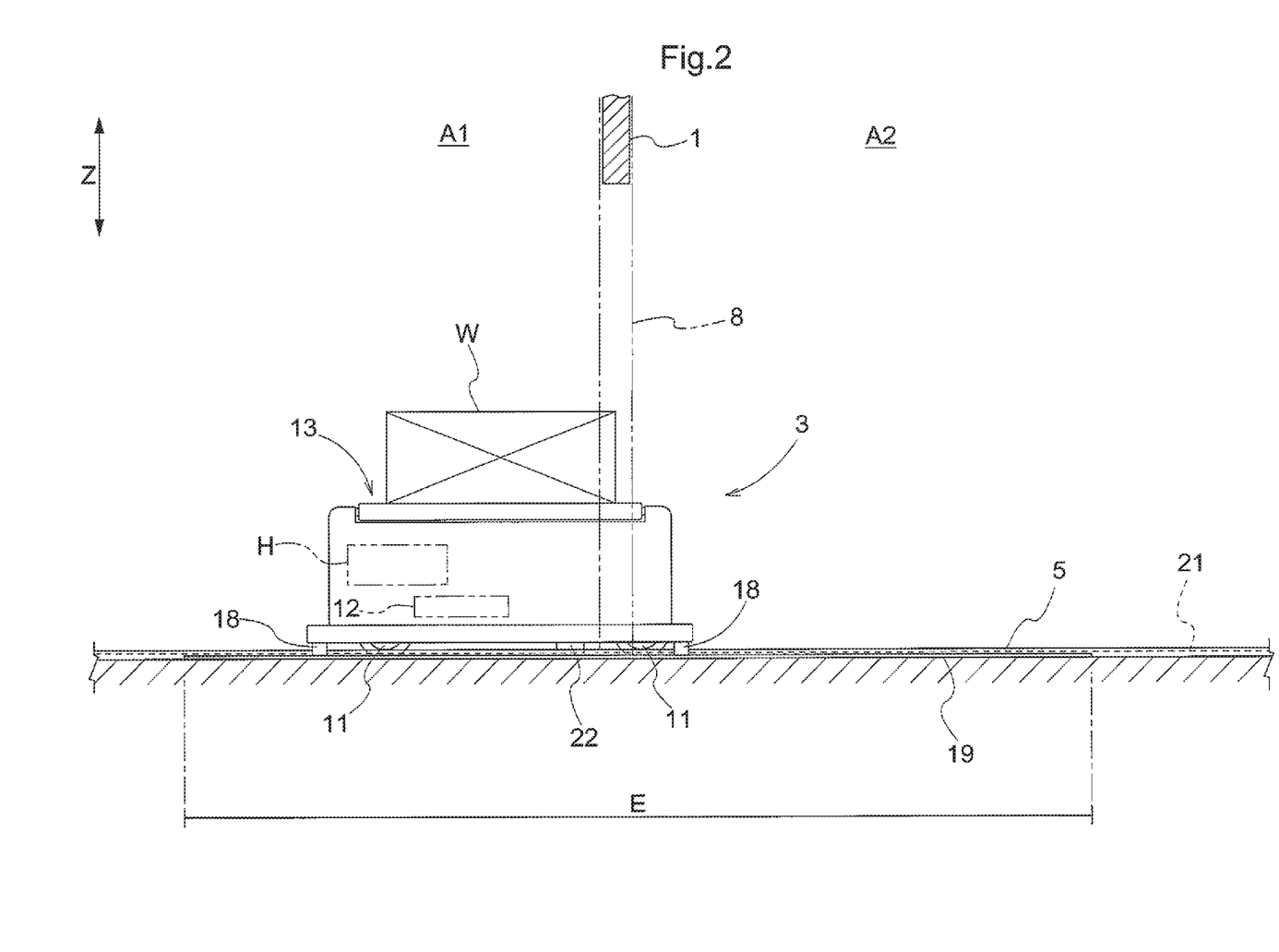
FIG. 2 is a side view of the article transport facility in the vicinity of a fire protection door.
Figure 3:
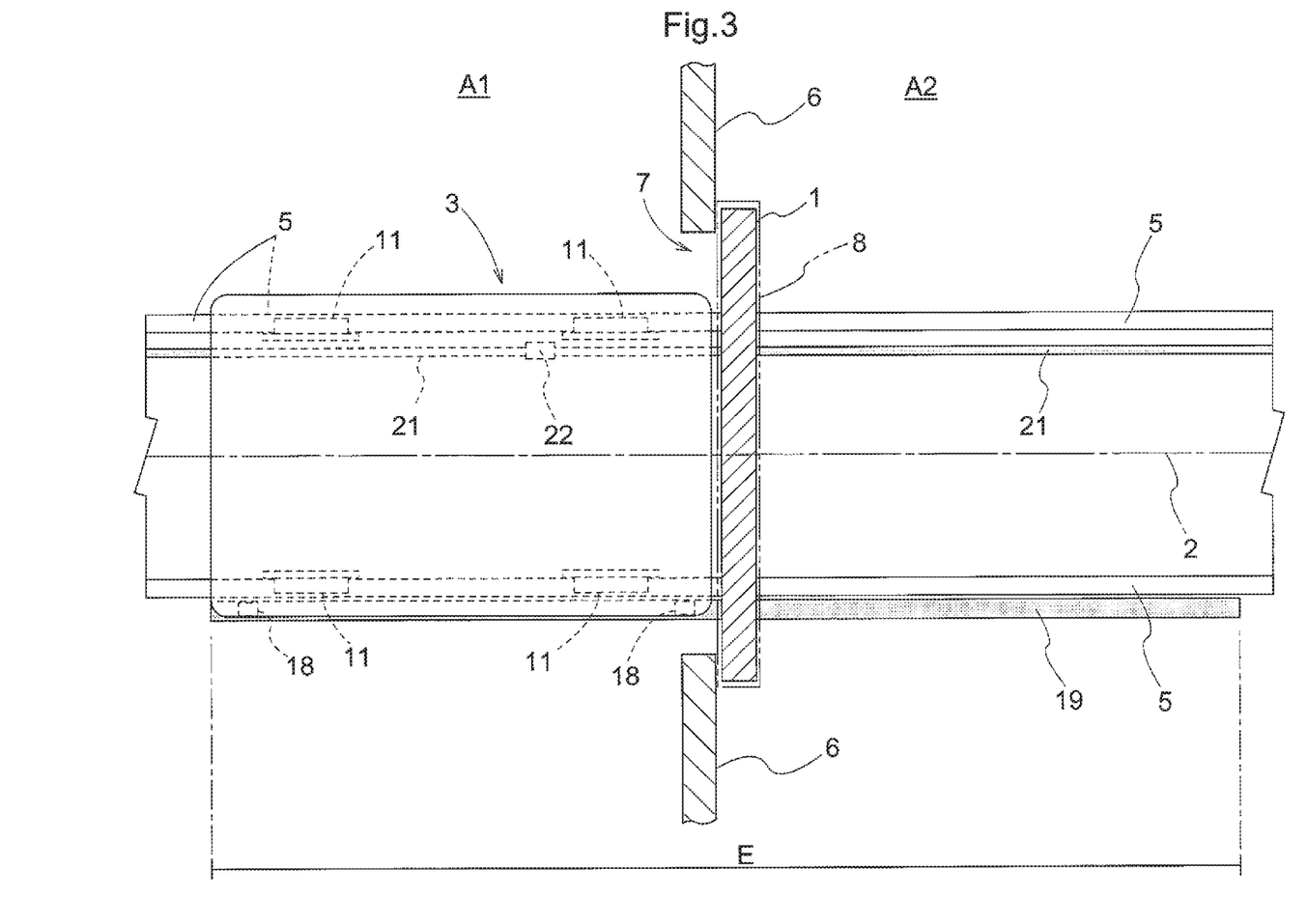
FIG. 3 is a plan view of the vicinity of the fire protection door in the article transport facility.
Figure 4:
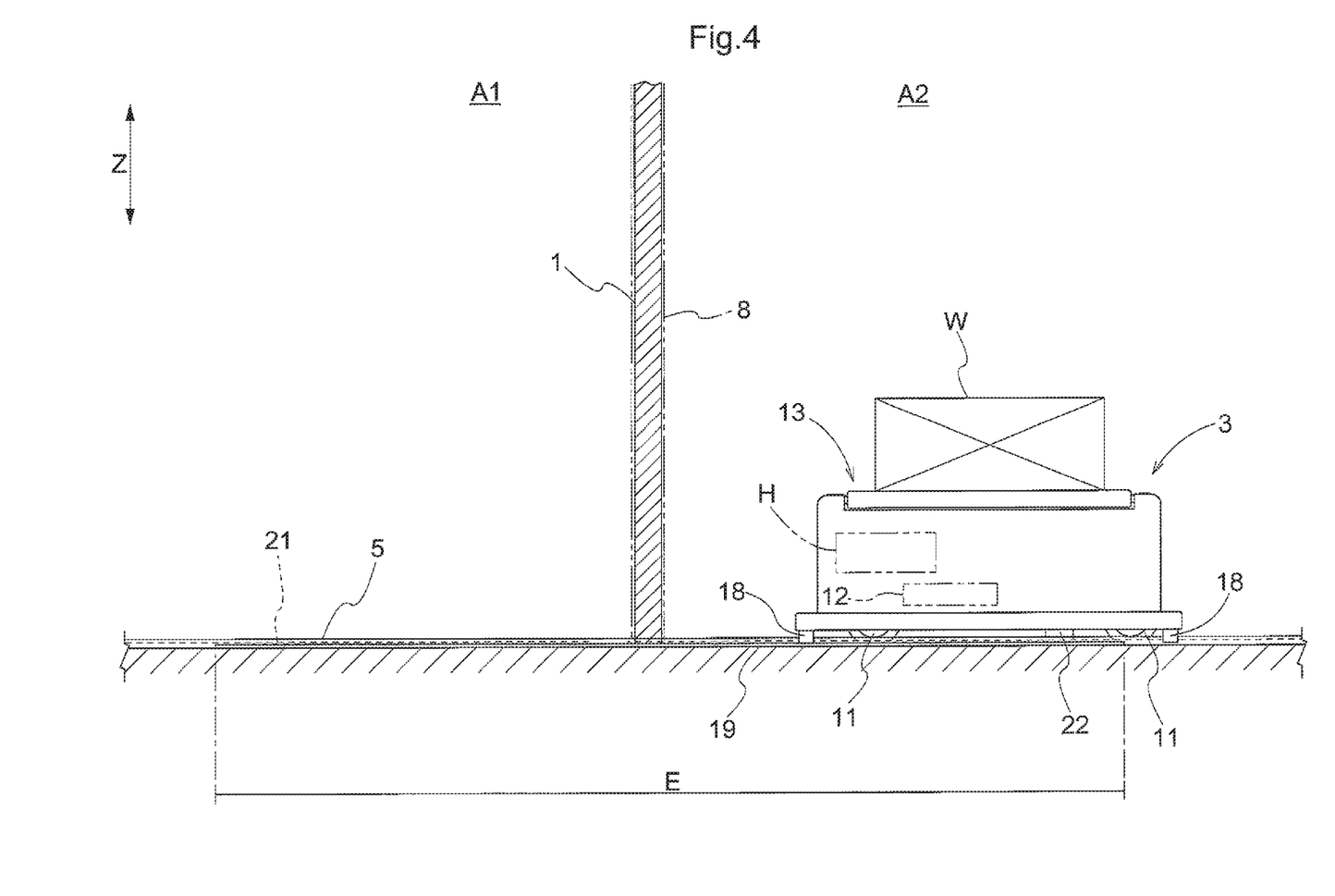
FIG. 4 is a side view of the vicinity of the fire protection door in the article transport facility.
Figure 5:
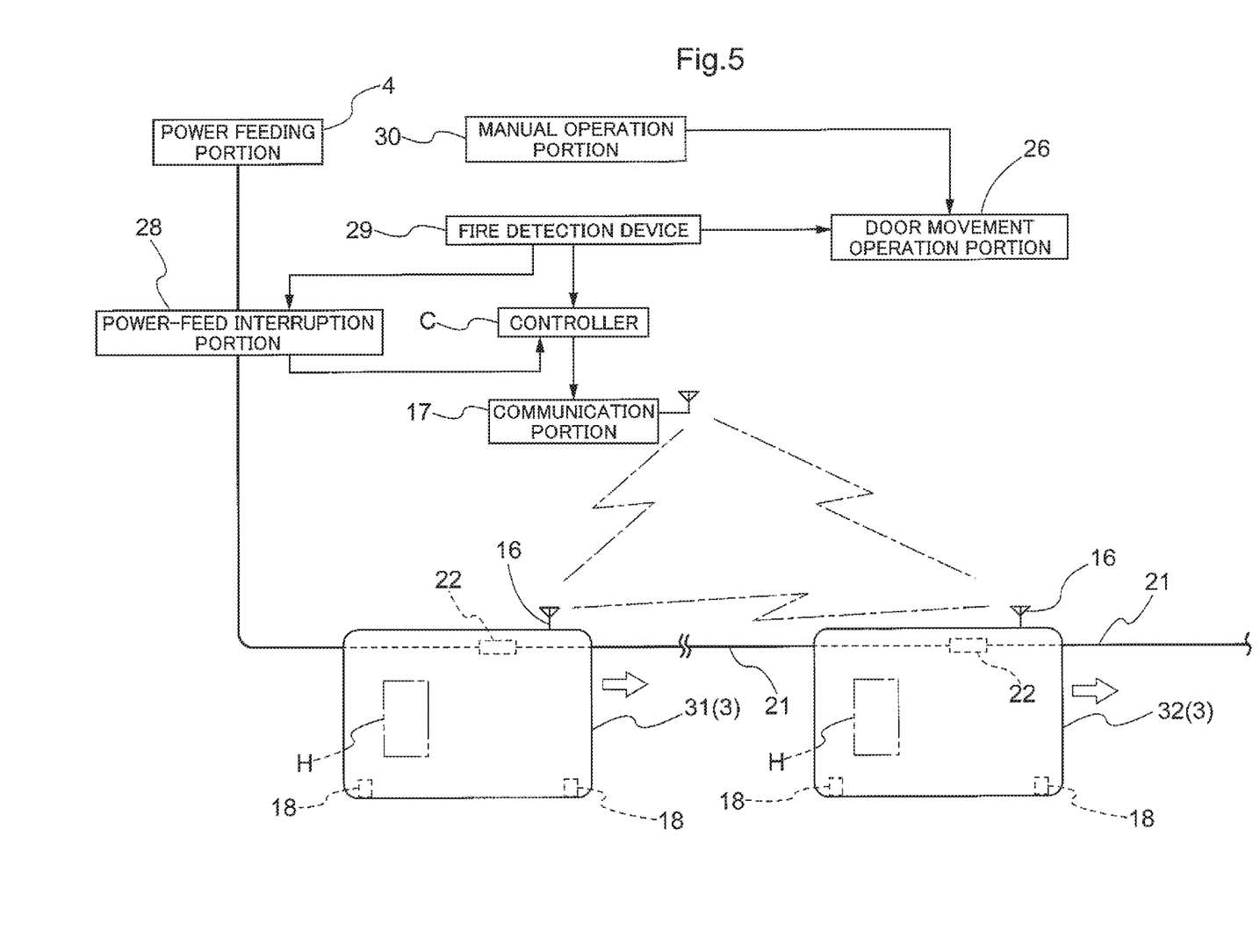
FIG. 5 is a control block diagram of the article transport facility.
Figure 6:
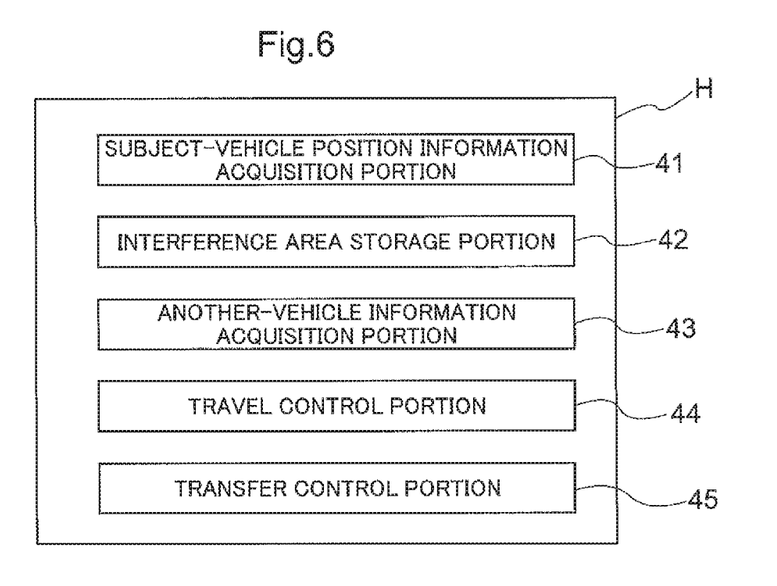
FIG. 6 is a control block diagram of a transport vehicle.

FIGS. 2 to 4 show the vicinity of the fire protection door 1 in the article transport facility 100. FIG. 5 shows a schematic control block diagram of the article transport facility 100, and FIG. 6 shows a schematic control block diagram of a transport vehicle 3. The article transport facility 100 includes a fire protection door 1 that can move from an open position (see FIG. 2) at which the transport vehicles 3 can travel along the travel path 2 to a closed position (see FIG. 4) at which the travel path 2 is blocked, when occurrence of a fire has been detected, a fire detection device 29 (see FIG. 5) that detects the occurrence of a fire, a controller C (see FIG. 5) that controls transport of articles W by the transport vehicles 3, and a power feeding portion 4 (see FIG. 5) that supplies driving power to the transport vehicles 3.

Although the fire protection door 1 that can move from the open position on the upper side to the closed position on the lower side, as shown in FIGS. 2 to 4, is illustrated here, the fire protection door 1 is not limited to such a configuration in which it can move in the vertical direction. The fire protection door 1 may be a sliding door that extends orthogonal to the extension direction of the travel path 2 (travel rails 5) and can move in the horizontal direction. That is, the fire protection door 1 may be any door that can move from an open position at which the transport vehicle 3 can travel along the travel path 2 to a closed position at which the travel path 2 is blocked.

As shown in FIGS. 2 to 4, travel rails 5 are installed on the floor surface of the article transport facility 100, along the travel path 2. The travel rails 5 are installed extending, for example, from a first area A1 to a second area A2 in a state in which the travel rails 5 pass through an opening 7 of a wall member 6. As shown in FIG. 3, the first area A1 and the second area A2 are divided by the wall member 6, and the fire protection door 1 opens and closes the opening 7 formed in the wall member 6. As shown in FIG. 4, the fire protection door 1 can move downward from the open position shown in FIG. 2 to the closed position located downward of the open position. The fire protection door 1 opens the opening 7 of the wall member 6 at the open position, and closes the opening 7 of the wall member 6 at the closed position. The fire protection door 1 at the open position is present above the travel path 2.

As shown in FIGS. 2 to 4, the transport vehicles 3 each include a control portion H, a power receiving portion 22, travel wheels 11, a travel motor 12, and a transport conveyor 13. The control portion H causes the transport vehicle 3 to autonomously travel in accordance with a transport instruction provided from the controller C, and controls the transport conveyor 13 that transfers an article W between the above-described transfer target location and the transport vehicle 3. As shown in FIG. 6, the control portion H includes a travel control portion 44 and a transfer control portion 45. The travel control portion 44 causes the transport vehicle 3 to travel along the travel path 2 by controlling the travel motor 12 serving as a driving portion that rotationally drives the travel wheels 11 that roll on the travel rails 5. The transfer control portion 45 controls the transport conveyor 13 that supports an article W and transports the article W. An article W is transferred between the transport conveyor 13 and the transfer target location by the transfer control portion 45 driving the transport conveyor 13 in a state in which the transport vehicle 3 is stopped adjacent to the transfer target location by the travel control portion 44.

As shown in FIGS. 2 to 5, the transport vehicle 3 includes a power receiving portion 22 that receives power supplied from a power feeding line 21 installed along the travel path 2. The power feeding line 21 is connected to the power feeding portion 4 serving as a power supply source. In a state in which driving power from the power feeding portion 4 is supplied, the driving power from the power feeding portion 4 is supplied to the travel motor 12 and the transport conveyor 13.

As shown in FIG. 5, each transport vehicle 3 includes a transport vehicle-side communication portion 16 that transmits and receives information to and from the controller C and other transport vehicles 3. The controller C includes a controller-side communication portion 17 that transmits and receives various types of information to and from a plurality of transport vehicles 3. Thus, the transport vehicles 3 are configured to be capable of exchanging various types of information with the controller C via wireless communication. When transmitting information, each of the transport vehicles 3 adds the corresponding identification information of the transport vehicle 3 to the information, and the controller C can identify the transport vehicle 3 to which the received information corresponds. When transmitting information, the controller C adds the corresponding identification information of each of the transport vehicles 3 to the information, and each of the transport vehicles 3 can identify the information corresponding to the own vehicle and receive that information.

As shown in FIG. 6, the control portion H further includes a subject-vehicle position information acquisition portion 41, an interference area storage portion 42, and an another-vehicle information acquisition portion 43. The subject-vehicle position information acquisition portion 41 is a functional portion that acquires subject-vehicle position information (own-vehicle position information P1) (see FIG. 10) which is information regarding a position of the own vehicle (a subject vehicle 31 (see FIGS. 5, 10) which is a transport vehicle 3 to be controlled by the control portion H) on the travel path 2. The another-vehicle information acquisition portion 43 is a functional portion that acquires another-vehicle information F2 (see FIG. 10) which is a traveling state of another vehicle 32 (see FIGS. 5, 10) which is a transport vehicle 3 that is different from the subject vehicle 31 and that travels along the travel path 2. The another-vehicle information F2 includes another-vehicle position information P2 which is information regarding a position of the another vehicle 32 on the travel path 2, and another-vehicle speed information V2 which is the traveling speed of the another vehicle 32 (see FIG. 10).

Note that the position information is detected by an encoder (not shown) provided in the transport vehicle 3. A detection error of the encoder is corrected using information acquired from a marker (indicating absolute coordinates on the travel path 2) provided on the travel path 2. The marker is a one-dimensional or two-dimensional bar code, a wireless chip, or the like, and is detected by a marker detector (a bar code reader, a wireless reader, or the like), which is not shown, provided in the transport vehicle 3.

The interference area storage portion 42 stores, as an interference area E, an area in which a portion of the transport vehicle 3 overlaps a door trajectory 8, which is a movement trajectory of the fire protection door 1, on the travel path 2. As shown in FIGS. 2 to 4, a detection target 19 is installed on the travel path 2 along the travel path 2, and the transport vehicle 3 includes an area detection portion 18 that detects the detection target 19. The detection target 19 is installed such that the detection target 19 is detected by the area detection portion 18 in a state in which a portion of the transport vehicle 3 overlaps the door trajectory 8. Here, since the interference area E is set to be an area in which a portion of the transport vehicle 3 overlaps the door trajectory 8, which is the movement trajectory of the fire protection door 1, on the travel path 2, the detection target 19 is detected by the area detection portion 18 in a state in which the whole transport vehicle 3 has entered the interference area E.

In other words, the detection target 19 is installed along the travel path 2 such that the detection target 19 is detected by the area detection portion 18 in a state in which the whole transport vehicle 3 has entered the interference area E and a portion of the transport vehicle 3 overlaps the door trajectory 8, and that the detection target 19 is not detected by the area detection portion 18 in a state in which at least a portion of the transport vehicle 3 has moved out from the interference area E and no portion of the transport vehicle 3 overlaps the door trajectory 8. That is, in a state in which the detection target 19 has been detected by the area detection portion 18, the whole transport vehicle 3 has entered the interference area E, and a portion of the transport vehicle 3 overlaps the door trajectory 8.

Here, a configuration is illustrated in which a total of two area detection portions 18 are provided, one each on the forward side and the rearward side of each of the transport vehicles 3, and the interference area E is set in an area corresponding to the position of the transport vehicle 3 when the two area detection portions 18 have both detected the detection target 19. However, one area detection portion 18 may be provided at any given location of each transport vehicle 3, and the interference area E may be set based on a result of detection by the one area detection portion 18.

As shown in FIG. 5, the article transport facility 100 includes a door movement operation portion 26 that moves the fire protection door 1 at the open position toward the closed position, a power-feed interruption portion 28 that interrupts the supply of power from the power feeding portion 4 to the power feeding line 21, a fire detection device 29 that detects a fire, and a manual operation portion 30 that is operated by an operator when moving the fire protection door 1 to the closed position.

The fire detection device 29 is constituted, for example, by a fire operation switch that is operated by an operator when a fire has occurred, or a fire detection portion that detects heat or smoke caused by a fire. The fire detection device 29 outputs a notification signal to the door movement operation portion 26, the power power-feed interruption portion 28, and the controller C when a fire is not detected, and stops outputting the notification signal when a fire has been detected as a result of the fire operation switch having been operated or the fire detection portion having detected heat or smoke. For example, the output terminal of the notification signal is pulled down to ground potential, and, if a fire is not detected, the fire detection device 29 outputs a notification signal at a voltage (e.g., a power supply voltage) on the positive side of ground potential. When the fire detection device 29 stops outputting the notification signal upon detecting a fire, the voltage of the notification signal has ground potential due to the pull down. That is, the fire detection device 29 detects a fire when the notification signal is not output at a positive potential. In other words, the notification signal is a negative logic signal, and the notification of detection of a fire is indicated by the cessation of the notification signal from the fire detection device 29.

The door movement operation portion 26 holds the fire protection door 1 at the open position, and releases the hold of the fire protection door 1 when the fire detection device 29 has detected a fire. That is, the door movement operation portion 26 releases the hold of the fire protection door 1, based on the fact that the notification signal from the fire detection device 29 is no longer input, or the fact that an operation signal transmitted due to the manual operation portion 30 being operated is input. The fire protection door 1 for which the hold by the door movement operation portion 26 has been released moves downward under its own weight from the open position to the closed position. Thus, the fire protection door 1 is configured to close when the fire detection device 29 has detected a fire, or when the manual operation portion 30 has been operated.

The power-feed interruption portion 28 is provided on a power feeding path from the power feeding portion 4 to the power feeding line 21. The power-feed interruption portion 28 includes an operation switch that is operated by the operator when performing an emergency stop for the transport vehicles 3, and the supply of power from the power feeding portion 4 to the power feeding line 21 is interrupted due to the operation switch being operated by an operator. The power-feed interruption portion 28 may interrupt the supply of power from the power feeding portion 4 to the power feeding line 21 due to the input of the notification signal being stopped. When the supply of power from the power feeding portion 4 to the power feeding line 21 is interrupted, the supply of the power received from the power feeding line 21 to the transport vehicles 3 will also be interrupted. As in the case of the notification signal of the fire detection device 29, an interruption signal, which is a negative logic signal, is output to the controller C from the power-feed interruption portion 28 (a positive potential when power supply is not interrupted, and ground potential when power supply is interrupted). When the supply of power from the power feeding portion 4 is interrupted by the power-feed interruption portion 28, the interruption signal that is output from the power-feed interruption portion 28 to the controller C is stopped. The supply of power from the power feeding portion 4 to the power feeding line 21 may also be interrupted by the breaking of a wire or the like due to a fire. It is preferable that the power-feed interruption portion 28 also stops outputting the interruption signal upon detecting that the supply of power from the power feeding portion 4 to the power feeding line 21 has stopped due to the breaking of a wire or the like.

The controller C transmits a transport instruction to the transport vehicle 3 if none of the following conditions are satisfied: the notification signal from the fire detection device 29 is no longer input (when the notification signal has ground potential); and the interruption signal from the power-feed interruption portion 28 is no longer input (when the interruption signal has ground potential). Each of the transport vehicles 3 transports an article W in accordance with a transport instruction. That is, the control portion H performs transport control when a transport instruction is received. In the transport control, the travel motor 12 and the transport conveyor 13 are controlled to transport the article W in accordance with the transport instruction. On the other hand, the controller C transmits emergency stop information to the transport vehicle 3 if one of the following conditions is satisfied: the notification signal from the fire detection device 29 is no longer input (when the notification signal has ground potential); and the interruption signal from the power-feed interruption portion 28 has been input (when the interruption signal has ground potential). The control portion H performs withdraw control when the emergency stop information has been received.

When the notification signal from the fire detection device 29 is no longer input to the controller C, the fire protection door 1 is automatically closed. That is, when the emergency stop information is transmitted from the controller C to the transport vehicle 3, the notification signal from the fire detection device 29 is also no longer input to the door movement operation portion 26 (the notification signal has ground potential). Accordingly, the door movement operation portion 26 releases the hold of the fire protection door 1, and the fire protection door 1 moves downward from the open position. The control portion H of the transport vehicle 3 can determine, based on the emergency stop information from the controller C, that the fire protection door 1 will move downward from the open position.

The control portion H quickly stops the transport vehicle 3 in the withdraw control. As for the position at which the transport vehicle 3 is stopped, traveling control may be performed using a stop position (Q1, Q2) set in front of the fire protection door 1 as a target stop position, and the transport vehicle 3 may be stopped at the stop position (Q1, Q2), as described above with reference to FIG. 1. Alternatively, traveling control to reduce speed may be performed, and the transport vehicle 3 may be stopped in the vicinity of the current position. Even when the stop position (Q1, Q2) set in front of the fire protection door 1 is used as the target stop position, another transport vehicle 3 may already be stopped at the stop position (Q1, Q2) set in front of the fire protection door 1, or may be traveling using the stop position (Q1, Q2) as the target stop position. In such cases, it is preferable that a predefined inter-vehicle distance is provided from another transport vehicle 3, and the transport vehicle 3 is stopped at a location rearward of another transport vehicle 3. When there is an article W being transferred, it is preferable that the transport vehicle 3 is stopped after transfer control for the article W is completed.

The control portion H quickly stops the own vehicle (the subject vehicle 31) by setting the target stop position of the own vehicle (the subject vehicle 31) and performing traveling control in the above-described manner. Here, when the own vehicle (the subject vehicle 31) is to be stopped in the vicinity of the current position, or when the stop position (Q1, Q2) set in front of the fire protection door 1 cannot be used as the target stop position, the transport vehicle 3 is stopped at a position other than the stop position (Q1, Q2) set in front of the fire protection door 1. At this time, the control portion H stops the transport vehicle 3 at a position (a position at which the transport vehicle 3 does not overlap the door trajectory 8) at which no portion of the transport vehicle 3 is included in the interference area E such that the stopped transport vehicle 3 will not come into contact with the fire protection door 1.

The control portion H of the subject vehicle 31 prohibits the whole subject vehicle 31 from entering the interference area E when occurrence of a fire has been detected, and if it is determined, based on the another-vehicle information F2 and the information regarding the interference area E, that the interference area E is present between the subject vehicle 31 and the another vehicle 32 located forward of the subject vehicle 31, and that a stoppable area S (see FIG. 9) corresponding to the length of the transport vehicle 3 along the travel path 2 is not secured between a rear end position of the another vehicle 32 and the fire protection door 1.

Figure 7:
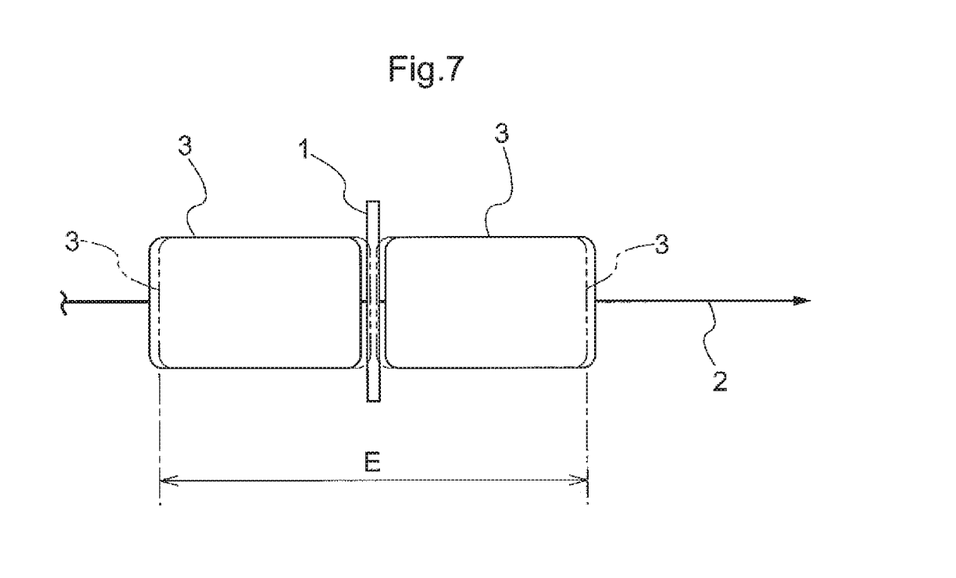
FIG. 7 is a diagram illustrating an interference area.

In the following, a description will be given with reference to FIGS. 7 to 9 also. As indicated by the dashed double-dotted lines in FIG. 7, the interference area E is an area in which the whole transport vehicle 3 is included, at each position at which a portion of the transport vehicle 3 overlaps the door trajectory 8, which is the movement trajectory of the fire protection door 1, on the travel path 2. As indicated by the solid lines in FIG. 7, even when most of the transport vehicle 3 is included in the area, the transport vehicle 3 can be stopped at a position at which no portion of the transport vehicle 3 overlaps the door trajectory 8. In consideration of a higher level of safety, it is, of course, possible to stop the transport vehicle 3 such that the transport vehicle 3 is prevented from completely overlapping the interference area E.

Figure 8:
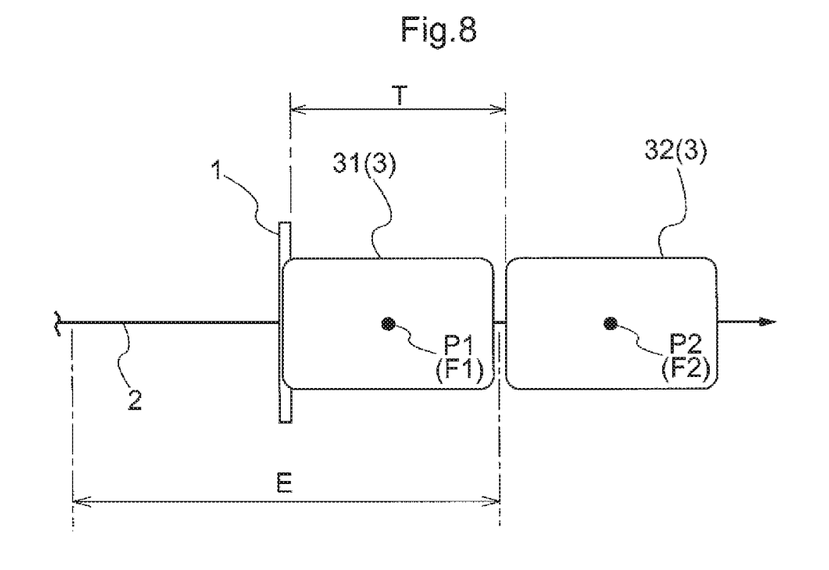
FIG. 8 is a diagram showing a relationship between a rear area of a leading vehicle and a subject vehicle.

FIG. 8 illustrates a configuration in which the another vehicle 32 has been stopped, and the subject vehicle 31 is stopped at a location rearward of the another vehicle 32, with a predefined inter-vehicle distance being secured therefrom. In this configuration, the interference area E is present between the another vehicle 32 and the subject vehicle 31, and a rear distance T between a rear end position of the another vehicle 32 and the fire protection door 1 is shorter than the sum of the vehicle length, which is the length along the traveling direction, of the subject vehicle 31 and the inter-vehicle distance. That is, the stoppable area S is not secured between the rear end position of the another vehicle 32 and the fire protection door 1. Therefore, in the configuration shown in FIG. 8, a portion of the subject vehicle 31 overlaps the door trajectory 8, which is the movement trajectory of the fire protection door 1, and may come into contact with the fire protection door 1 when the fire protection door 1 moves down to the closed position.

When the stoppable area S is not secured between the rear end position of the another vehicle 32 and the fire protection door 1 as in this case, the control portion H prohibits the whole subject vehicle 31 from entering the interference area E. As shown in FIG. 9, it is possible to prevent the subject vehicle 31 and the fire protection door 1 from coming into contact with each other by stopping the subject vehicle 31 at a position at which a portion of the subject vehicle 31 overlaps the interference area E without the whole subject vehicle 31 entering the interference area E. On the other hand, when the stoppable area S is secured between the rear end position of the another vehicle 32 and the fire protection door 1, the subject vehicle 31 does not overlap the door trajectory 8 even when the subject vehicle 31 is stopped on the downstream side of the fire protection door 1. Accordingly, the subject vehicle 31 does not come into contact with the fire protection door 1 even when the fire protection door 1 moves down to the closed position.

Figure 10:
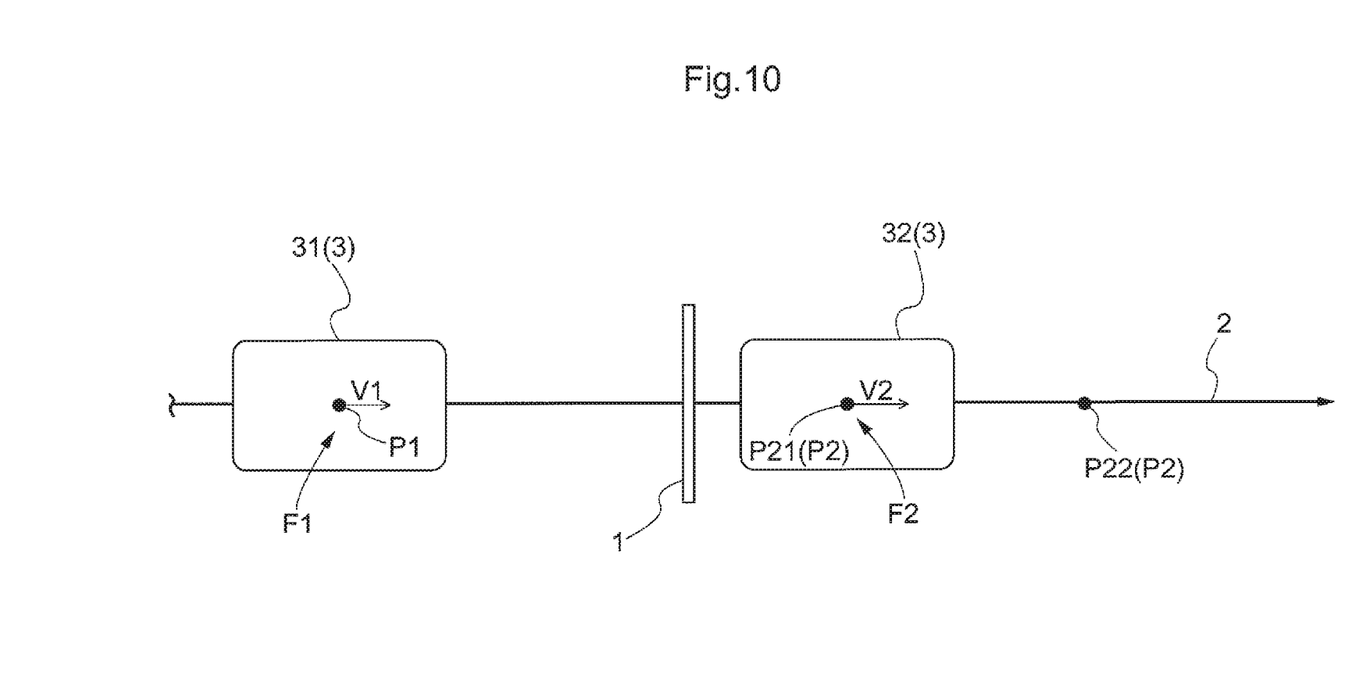
FIG. 10 is a diagram showing a principle of estimation of a stop position of a leading vehicle.

Meanwhile, the subject vehicle 31 acquires the position information (another-vehicle position information P2) regarding the another vehicle 32. However, if the another vehicle 32 is traveling when the withdraw control is started, the another vehicle 32 stops at a location forward of the position indicated by the another-vehicle position information P2 acquired by the subject vehicle 31. Accordingly, even when the rear distance T based on the another-vehicle position information P2 is shorter than the stoppable area S, the rear distance T after the another vehicle 32 has moved forward may be longer than the stoppable area S. Therefore, as shown in FIG. 10, it is preferable that the control portion H estimates the stop position (second another-vehicle position information P22) of the another vehicle 32 based on the another-vehicle position information P2 (first another-vehicle position information P21) and the another-vehicle speed information V2, and determines whether or not the stoppable area S is secured based on the rear end position of the another vehicle 32 at the estimated stop position. It is preferable that the control portion H then performs the withdraw control on the subject vehicle 31, based on the own-vehicle position information P1 and the own-vehicle speed information V1 included in the own vehicle information F1 (subject vehicle information).

As described above, the supply of power from the power feeding portion 4 to the power feeding line 21 may be interrupted by the power-feed interruption portion 28, or the supply of power from the power feeding portion 4 to the power feeding line 21 may be interrupted by the breaking of a wire or the like due to a fire. When the supply of power to the power feeding line 21 ceases, the supply of power to the travel motor 12 and the like also ceases. Here, when the transport vehicle 3 stops in the interference area E, the transport vehicle 3 and the fire protection door 1 may come into contact with each other. Therefore, in order to enable withdrawal from the interference area E even in such a case, it is preferable that an emergency power supply device 90 including an uninterruptible power supply 9 is provided. The uninterruptible power supply 9 is provided in an area corresponding to the interference area E in the travel path 2, and supplies power to the transport vehicle 3 when power fails.

Figure 11:
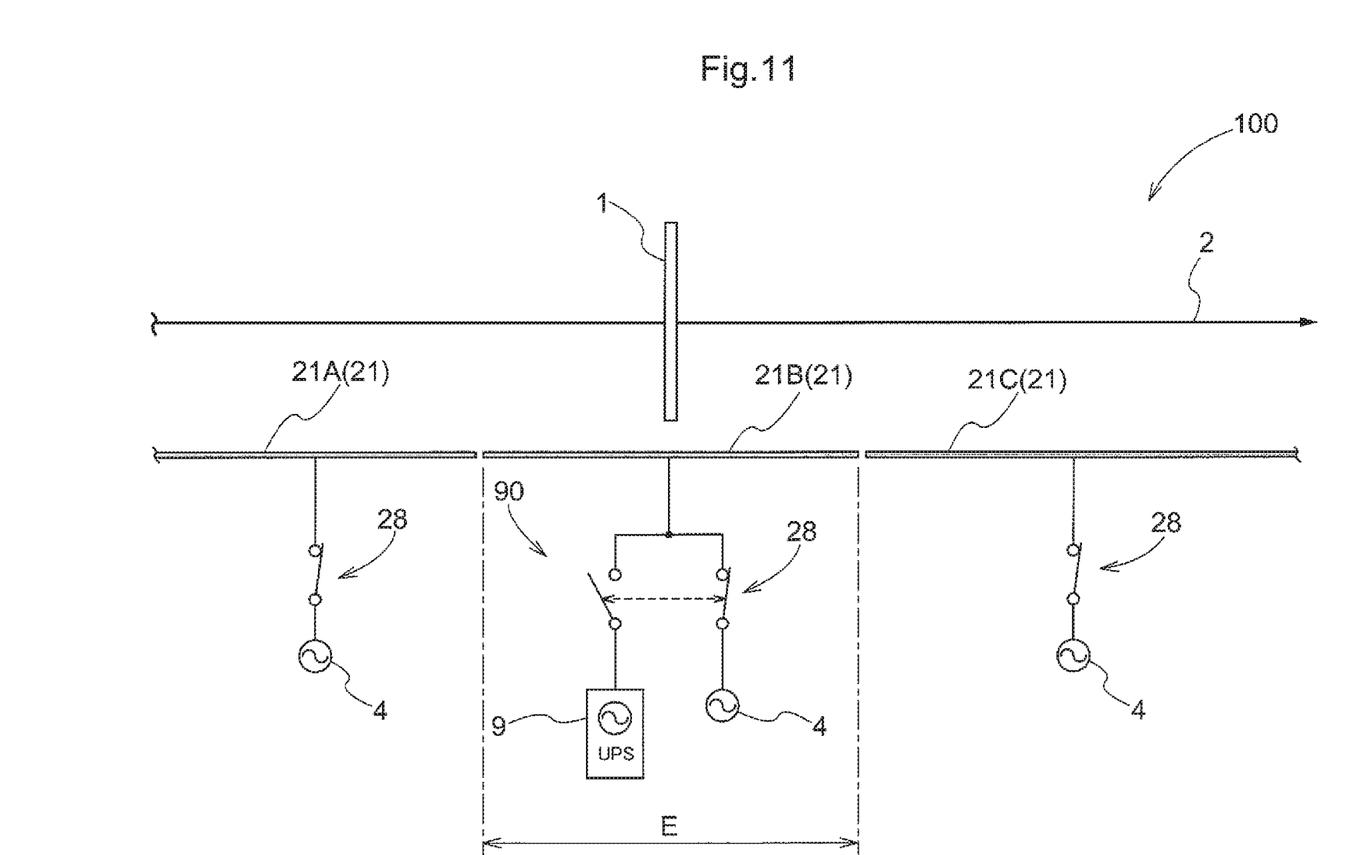
FIG. 11 is a diagram showing an example of an auxiliary power supply in an interference area.

The power feeding line 21 is installed so as to divide the travel path 2 into a plurality of partitions. FIG. 11 illustrates a configuration in which a first power feeding line 21A, a second power feeding line 21B, and a third power feeding line 21C are respectively installed in three partitions, and the second power feeding line 21B is installed in the interference area E. The supply of power from the power feeding portion 4 to all of the first power feeding line 21A, the second power feeding line 21B, and the third power feeding line 21C is interrupted, for example, as a result of a breaker (an example of the power-feed interruption portion 28) of the power feeding portion 4 being interrupted. The emergency power supply device 90 supplies power to the transport vehicle 3 by connecting the uninterruptible power supply 9 to the second power feeding line 21B when the supply of power from the power feeding portion 4 to the second power feeding line 21B in the interference area E has ceased (when the interruption signal is invalid). The emergency power supply device 90 includes a switch 91 (a relay or the like) that is in an open state when the interruption signal is valid, and is in a connected state when the interruption signal is invalid.

Note that it is sufficient that the uninterruptible power supply 9 can supply power that allows the transport vehicle 3 located in the interference area E to exit from the interference area E. Accordingly, the amount of power of the uninterruptible power supply 9 may be smaller than the amount of power of the power feeding portion 4. It is also preferable that, when the power supplied from the power feeding portion 4 is three-phase AC power, the power supplied from the uninterruptible power supply 9 is single-phase AC power. This can simplify the structure of the emergency power supply device 90 including the uninterruptible power supply 9.

Other Embodiments

The following is a description of other embodiments. Note that the configurations of the embodiments described below are not limited to being used alone, and may be used in combination with configurations disclosed in other embodiments as long as no inconsistency arises.

(1) The above embodiment describes, with reference to FIG. 6, an exemplary configuration in which the control portion H includes the subject-vehicle position information acquisition portion 41, the interference area storage portion 42, and the another-vehicle information acquisition portion 43. However, it is possible to adopt a configuration in which the controller C includes the interference area storage portion 42, and the subject-vehicle position information acquisition portion 41 and the another-vehicle information acquisition portion 43 for each of the transport vehicles 3, and each of the transport vehicles 3 is controlled through communication. In this case, the controller C corresponds to the control portion that controls the transport vehicles.

Figure 9:
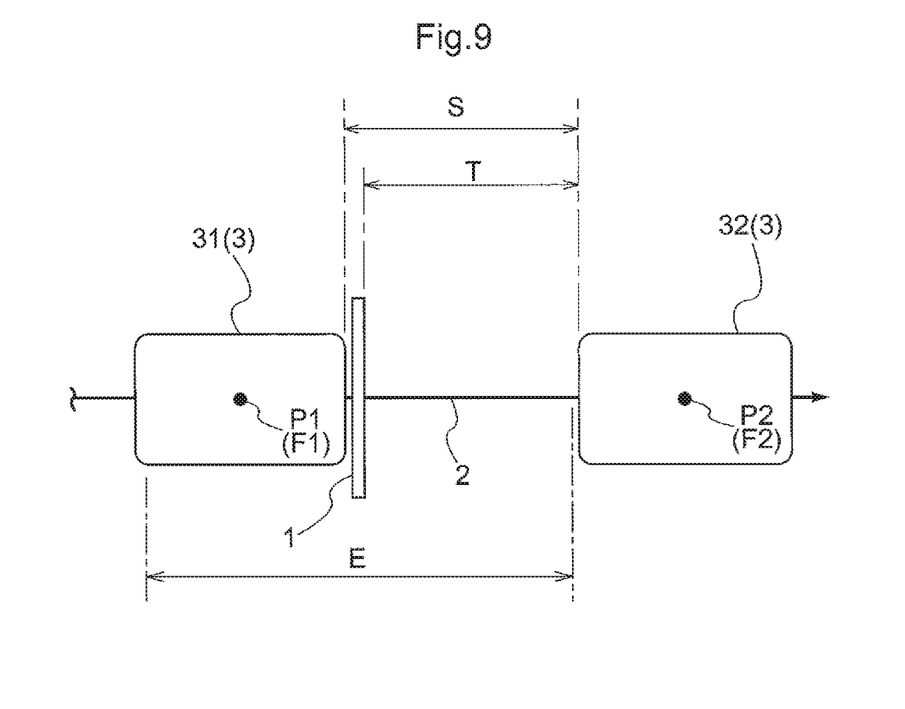
FIG. 9 is a diagram showing a relationship between a rear area of a leading vehicle and a stoppable area of a subject vehicle.

(2) The above embodiment describes, with reference to FIG. 9, an exemplary configuration in which the whole subject vehicle 31 is prohibited from entering the interference area E when the stoppable area S is not secured between the rear end position of the another vehicle 32 located forward of the subject vehicle 31 and the fire protection door 1. However, the control portion H may prohibit a portion of the subject vehicle 31 from entering the interference area E. That is, the control portion H may perform control such that the subject vehicle 31 and the interference area E do not overlap at all.

(3) Although the above embodiment describes an exemplary configuration in which the stoppable area S is set between the rear end position of the another vehicle 32 and the fire protection door 1, the stoppable area S may be set between the rear end position of the another vehicle 32 and the downstream end portion of the interference area E.

(4) The above embodiment describes an exemplary configuration in which the interference area E is specified by detecting the detection target 19 installed along the travel path 2 by the area detection portion 18 installed in each of the transport vehicles 3, and the interference area E is stored in the interference area storage portion 42 of each of the transport vehicles 3. However, the interference area E may be specified in advance based on the absolute position in the article transport facility 100, and the interference area storage portion 42 of each of the transport vehicles 3 may store the same information. Even when the controller C corresponds to the control portion that controls the transport vehicle as described above, one interference area storage portion 42 provided in the controller C may store the information regarding the same interference area E.

(5) The above embodiment describes an exemplary configuration in which the transport vehicle 3 travels along the travel rails 5. However, the transport vehicle 3 is not limited to the above-described configuration as long as the transport vehicle 3 travels along a predefined travel path 2. For example, the transport vehicle 3 may be a transport traveling member that travels along a travel path virtually set on the floor surface or the ground surface.

(6) The above embodiment describes an exemplary configuration in which, when occurrence of a fire has been detected, the control portion H determines whether or not the stoppable area is secured, and prohibits the whole subject vehicle 31 from entering the interference area E. However, also in consideration of a case where the fire protection door 1 is immediately brought into the closed state when occurrence of a fire has been detected, it is preferable that the transport vehicle 3 can always stop at a position at which the transport vehicle 3 does not overlap the door trajectory 8. Accordingly, it is possible to adopt a configuration in which, also in a normal state, the control portion H determines whether or not the stoppable area is secured, and the entry of the subject vehicle 31 into the interference area E is prohibited. For this configuration as well, the likelihood of the transport vehicle 3 coming into contact with the fire protection door 1 can be reduced during a normal traveling control, based on the positional relationship between the leading another vehicle 32 and the subject vehicle 31, rather than by controlling the advancement of the subject vehicle 31 using interlock or the like. That is, also in this configuration, the transport efficiency in a normal state can be made higher than that when the advancement of the subject vehicle 31 is controlled using interlock or the like.

Outline of the Embodiment

The following is a brief description of an outline of the embodiment of the article transport facility described above.

According to an aspect, an article transport facility that transports an article using a transport vehicle that travels along a travel path includes: a fire detection device that detects occurrence of a fire; a fire protection door that can move from an open position at which the transport vehicle can travel along the travel path to a closed position at which the travel path is blocked, when occurrence of a fire has been detected; and a control portion that controls the transport vehicle, wherein the control portion includes: a subject-vehicle position information acquisition portion that acquires subject-vehicle position information which is information regarding a position of a subject vehicle on the travel path, the subject vehicle being a transport vehicle to be controlled; an interference area storage portion that stores, as an interference area, an area in which the transport vehicle is located in a state in which a portion of the transport vehicle overlaps a door trajectory which is a movement trajectory of the fire protection door, on the travel path; and an another-vehicle information acquisition portion that acquires another-vehicle information which is a traveling state of another vehicle, the another vehicle being is a transport vehicle that is different from the subject vehicle and that travels along the travel path, and the control portion prohibits the whole subject vehicle from entering the interference area if it is determined, based on the another-vehicle information and information regarding the interference area, that the interference area is present between the another vehicle located forward of the subject vehicle and the subject vehicle, and that a stoppable area corresponding to a length of the transport vehicle along the travel path is not secured between a rear end position of the another vehicle and the fire protection door.

With this configuration, the whole subject vehicle is prohibited from entering the interference area when the stoppable area is not secured between the rear end position of the another vehicle located forward of the subject vehicle and the fire protection door. The interference area is an area in which the transport vehicle is located in a state in which a portion of the transport vehicle overlaps a door trajectory which is a movement trajectory of the fire protection door, on the travel path, and the transport vehicle and the door trajectory overlap each other when the interference area and the whole transport vehicle overlap each other. When the interference area and the whole transport vehicle do not overlap each other, the transport vehicle and the door trajectory do not overlap each other, and the transport vehicle and the fire protection door at the closed position do not come into contact with each other. With the present configuration, when the stoppable area is not secured between the rear end position of the another vehicle and the fire protection door, control is performed such that the whole transport vehicle does not to enter the interference area. Whether or not the stoppable area is secured is determined based on the another-vehicle information which is a traveling state of the another vehicle that travels along the travel path. That is, the likelihood of the transport vehicle coming into contact with the fire protection door can be reduced during normal traveling control based on the positional relationship between the leading another vehicle and the subject vehicle, rather than by controlling the advancement of the subject vehicle using interlock or the like. Thus, with the present configuration, it is possible to transport articles with high transport efficiency in a normal state in which a fire has not occurred. When a fire has occurred, it is possible to prevent the transport vehicle and the fire protection door from coming into contact with each other, and to promptly stop the transport vehicle and close the fire protection door.

Here, it is preferable that, when occurrence of a fire has been detected, the control portion determines whether or not the stoppable area is secured.

With this configuration, the restriction of entry into the interference area is performed when occurrence of a fire has been detected. Accordingly, the traveling of the transport vehicle is not further prevented in a normal state, and the transport efficiency is not reduced. When occurrence of a fire has been detected, whether or not the entry of the subject vehicle into the interference area is to be restricted can be appropriately determined based on the another-vehicle information.

Here, it is preferable that the another-vehicle information includes another-vehicle position information which is information regarding a position of the another vehicle on the travel path, and another-vehicle speed information which is a traveling speed of the another vehicle, and the control portion estimates a stop position of the another vehicle based on the another-vehicle position information and the another-vehicle speed information, and determines whether or not the stoppable area is secured based on the rear end position of the another vehicle at the estimated stop position.

The subject vehicle acquires the another-vehicle information including the another-vehicle position information. However, when another vehicle is traveling, the another vehicle stops at a location forward of the position indicated by the another-vehicle position information acquired by the subject vehicle. Accordingly, the distance between the rear end position of the another vehicle and the fire protection door at the position at which the another vehicle has actually stopped may be longer than the distance between the rear end position of the another vehicle and the fire protection door based on the another-vehicle position information. As in the present configuration, by estimating the actual stop position of the another vehicle based on the another-vehicle position information and the another-vehicle speed information, and determining whether or not the stoppable area is secured based on the rear end position of the another vehicle at the estimated stop position, it is possible to make the determination more accurately.

It is preferable that an uninterruptible power supply that supplies power to the transport vehicle when power fails is provided in an area corresponding to the interference area in the travel path.

The supply of power to the transport vehicle may be discontinued by the breaking of a wire or the like due to a fire. Here, if the transport vehicle has stopped in the interference area, the transport vehicle and the fire protection door may come into contact with each other. Therefore, in order to allow the transport vehicle to withdraw from at least the interference area even in such a case, it is preferable that an uninterruptible power supply is provided in an area corresponding to the interference area in the travel path.

What is claimed is:

1. An article transport facility that transports an article using a transport vehicle that travels along a travel path, comprising:
    a fire detection device that detects occurrence of a fire;
    a fire protection door that can move from an open position at which the transport vehicle can travel along the travel path to a closed position at which the travel path is blocked, when occurrence of a fire has been detected; and
    a control portion that controls the transport vehicle,
    wherein the control portion includes:
    a subject-vehicle position information acquisition portion that acquires subject-vehicle position information which is information regarding a position of a subject vehicle on the travel path, the subject vehicle being a transport vehicle to be controlled;
    an interference area storage portion that stores, as an interference area, an area in which the transport vehicle is located in a state in which a portion of the transport vehicle overlaps a door trajectory which is a movement trajectory of the fire protection door, on the travel path; and
    an another-vehicle information acquisition portion that acquires another-vehicle information which is a traveling state of another vehicle, the another vehicle being a transport vehicle that is different from the subject vehicle and that travels along the travel path,
    wherein the control portion prohibits the whole subject vehicle from entering the interference area if it is determined, based on the another-vehicle information and information regarding the interference area, that the interference area is present between the another vehicle located forward of the subject vehicle and the subject vehicle, and that a stoppable area corresponding to a length of the transport vehicle along the travel path is not secured between a rear end position of the another vehicle and the fire protection door, and
    wherein, in a case where the control portion is unable to stop the subject vehicle in front of the interference area, the control portion stops the subject vehicle such that a portion of the interference area which portion is in front of the fire protection door overlaps a portion of the subject vehicle.

2. The article transport facility according to claim 1, wherein, when occurrence of a fire has been detected, the control portion determines whether or not the stoppable area is secured.

3. The article transport facility according to claim 1, wherein the another-vehicle information includes another-vehicle position information which is information regarding a position of the another vehicle on the travel path, and another-vehicle speed information which is a traveling speed of the another vehicle, and
    wherein the control portion estimates a stop position of the another vehicle based on the another-vehicle position information and the another-vehicle speed information, and determines whether or not the stoppable area is secured based on the rear end position of the another vehicle at the estimated stop position.

4. The article transport facility according to claim 1, further comprising an uninterruptible power supply that in response to ceasing of supply power to a power feeding line extending along the travel path, supplies power to the transport vehicle-in an area corresponding to the interference area.

* * * * *